(12) United States Patent
Ganesan et al.

(10) Patent No.: US 12,236,269 B2
(45) Date of Patent: Feb. 25, 2025

(54) DISTRIBUTION OF WORKLOADS IN CLUSTER ENVIRONMENT USING SERVER WARRANTY INFORMATION

(71) Applicant: Dell Products, L.P., Round Rock, TX (US)

(72) Inventors: Vaideeswaran Ganesan, Bangalore (IN); Praveen Lalgoudar, Bangalore (IN); Rushyendra Velamuri, Bangalore (IN); Winston X. Fernandes, Sirsi (IN); Pandiyan Varadharajan, Bangalore (IN); Rekha M S, Karnataka (IN); Abhishek Gupta, Rohini (IN)

(73) Assignee: Dell Products, L.P., Round Rock, TX (US)

( * ) Notice: Subject to any disclaimer, the term of this patent is extended or adjusted under 35 U.S.C. 154(b) by 665 days.

(21) Appl. No.: 17/409,930

(22) Filed: Aug. 24, 2021

(65) Prior Publication Data
US 2023/0044503 A1 Feb. 9, 2023

(30) Foreign Application Priority Data

Jul. 23, 2021 (IN) .............................. 202111033260

(51) Int. Cl.
*G06F 9/50* (2006.01)
*G06F 11/20* (2006.01)
*G06N 20/00* (2019.01)

(52) U.S. Cl.
CPC ........ *G06F 9/5005* (2013.01); *G06F 11/2051* (2013.01); *G06N 20/00* (2019.01); *G06F 2201/87* (2013.01)

(58) Field of Classification Search
None
See application file for complete search history.

(56) References Cited

U.S. PATENT DOCUMENTS

| 2016/0266962 A1* | 9/2016 | Rajasekharan | ....... G06F 9/5072 |
| 2018/0203750 A1* | 7/2018 | Nguyen | ................. G01R 23/02 |

(Continued)

OTHER PUBLICATIONS

G. Wang, L. Zhang and W. Xu, "What Can We Learn from Four Years of Data Center Hardware Failures?," 2017 47th Annual IEEE/IFIP International Conference on Dependable Systems and Networks (DSN), Denver, CO, USA, 2017, pp. 25-36, doi: 10.1109/DSN.2017.26. (Year: 2017).*

*Primary Examiner* — Frank D Mills
(74) *Attorney, Agent, or Firm* — Fogarty LLP

(57) ABSTRACT

Systems and methods take into account the criticality of workloads, the warranty needs of workloads, the warranty available time, and the lifetime of a workload to provide an optimal solution that ensures servers are used to highest extent. The warranty health of servers is computed and categorized as critical, warning, or healthy based on the number of days remaining in warranty. Workloads are tagged as short-term or long-term workloads. Workloads are also classified based on criticality. The quarantine mode for proactive high availability of servers is divided into multiple modes, including a long-time, critical-workload quarantine mode, a critical-workload quarantine mode, and a standard quarantine mode. Servers that are in quarantine mode are assigned new workloads based upon the warranty health, workload term, and workload criticality.

11 Claims, 5 Drawing Sheets

(56) References Cited

U.S. PATENT DOCUMENTS

2020/0097358 A1* 3/2020 Mahindru ............. G06F 11/076
2020/0099592 A1* 3/2020 Mahindru ........... H04L 41/5019
2020/0310851 A1* 10/2020 Featonby .............. G06F 9/5027

* cited by examiner

DISTRIBUTION OF WORKLOADS IN CLUSTER ENVIRONMENT USING SERVER WARRANTY INFORMATION

CROSS REFERENCE TO RELATED APPLICATIONS

This patent application claims priority to co-pending, commonly assigned Indian Patent Application No. 202111033260, filed Jul. 23, 2021 and entitled "Distribution of Workloads in Cluster Environment Using Server Warranty Information," the entire contents of which are incorporated by reference herein.

FIELD

The present disclosure generally relates to warranties for data centers and, more particularly, to assigning workloads to nodes in data center clusters based upon node warranties for the clusters.

BACKGROUND

Information Handling Systems (IHSs) process, compile, store, and/or communicate information or data for business, personal, or other. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as enterprise blade servers that are stacked and installed within racks. A data center may include large numbers of such server racks that are organized into rows of racks. Administration of such large groups of IHSs may require teams of remote and local administrators working in shifts in order to support around-the-clock availability of the data center operations while minimizing any downtime. A data center may include a wide variety of hardware systems and software applications that may each be separately covered by warranties. The warranties available for a particular data center are typically based upon the tier of the city where the data center is located, the type of devices in the data center, and customer preferences. An IT operation center may manage IHSs residing in multiple geographic locations. The applicable warranty for those IHs depends on where the server is located. Accordingly, an IT operation center may have to deal with different warranties across different data centers, clusters, and servers.

SUMMARY

Systems and methods take into account the criticality of workloads, the warranty needs of workloads, the warranty available time, and the lifetime of a workload to provide an optimal solution that ensures servers are used to highest extent. The warranty health of servers is computed and categorized as critical, warning, or healthy based on the number of days remaining in warranty. Workloads are tagged as short-term or long-term workloads. Workloads are also classified based on criticality. The quarantine mode for proactive high availability of servers is divided into multiple modes, including a long-time, critical-workload quarantine mode, a critical-workload quarantine mode, and a standard quarantine mode. Servers that are in quarantine mode are assigned new workloads based upon the warranty health, workload term, and workload criticality.

In an alternative embodiment, systems and methods distribute workloads in a multi-cluster environment. A cluster support score is computed by considering resource consumption and the warranties of individual nodes across multiple clusters. Workloads are classified based on needs to determine which clusters would be suitable for deployment. A workload Service Level Agreement (SLA) score is computed by an Artificial Neural Network for Workload Prediction considering multiple parameters and properties. The workload SLA is then matched with a cluster support score, and the workloads are distributed across multiple clusters such that the workload SLAs are met by the assigned clusters.

BRIEF DESCRIPTION OF THE DRAWINGS

The present invention(s) is/are illustrated by way of example and is/are not limited by the accompanying figures. Elements in the figures are illustrated for simplicity and clarity and have not necessarily been drawn to scale.

DETAILED DESCRIPTION

Figure 1:
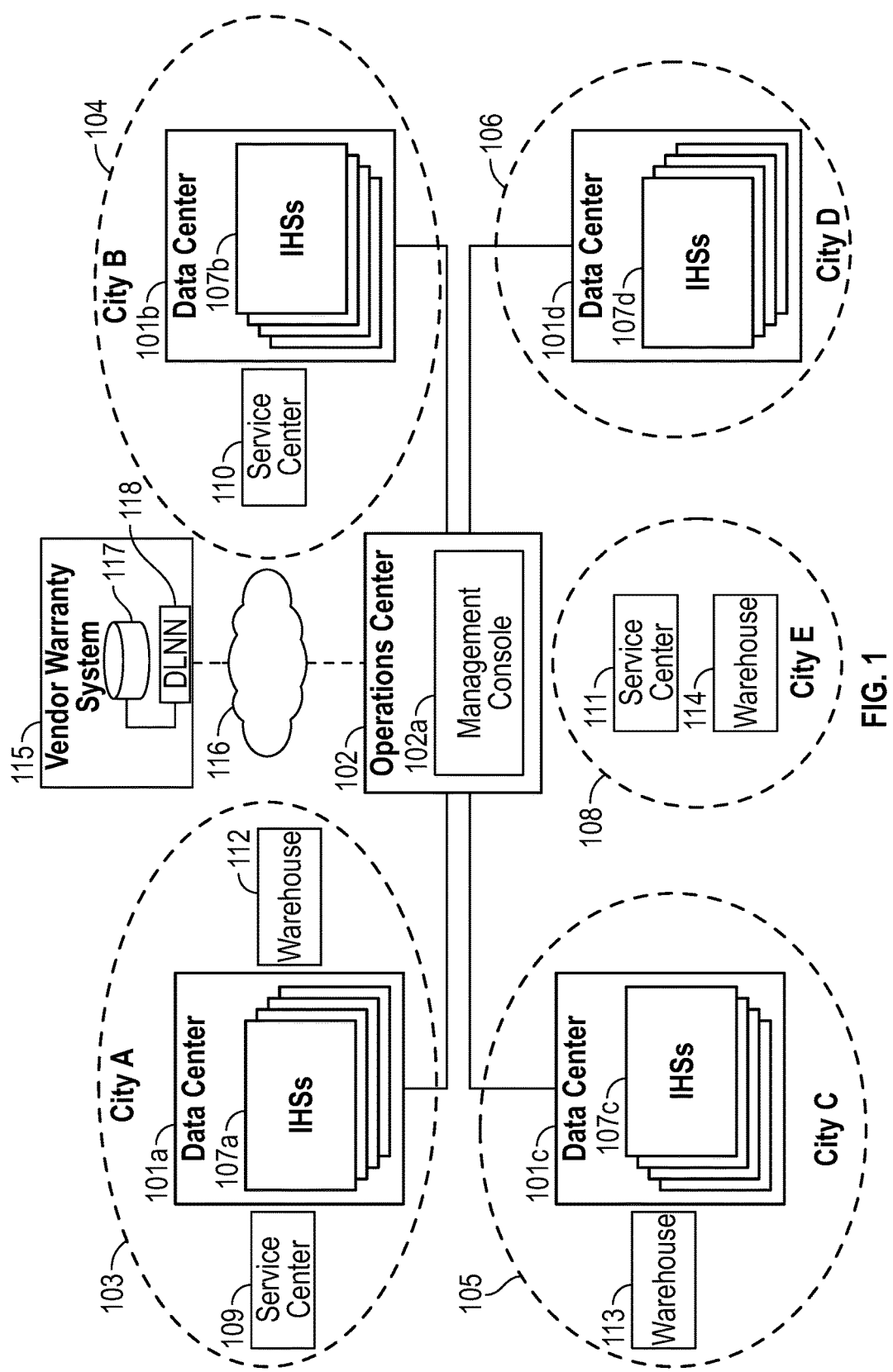
FIG. 1 is a block diagram illustrating a plurality of data centers that are managed by a central operations center according to an example embodiment.

FIG. 1 is a block diagram illustrating a plurality of data centers 101*a-d* that are managed by a central operations center 102. Each data center 101*a-d* is located in a different city 103-106. Data centers 101*a-d* may include a large number of IHSs 107*a-d* that may be installed as components of a chassis. Multiple chassis may be housed within a rack, and data centers 101*a-d* may utilize large numbers of racks, with various different types of chassis installed in the various rack configurations. By configuring a chassis with different IHS 107*a-d*, the chassis may be adapted to support specific types of operations, thus providing a computing solution that is directed toward a specific type of computational task. Components of the IHSs 107*a-d* may be provided by multiple vendors and may be installed at different times. Accordingly, data center administrators at operations center 102 need to track and assess the warranty coverage of the components within the various data centers 101*a-d*. Certain components of operations center 102 and/or data centers 101*a-d* may be configured to implement the systems and methods described herein.

IHSs 107*a-d* may comprise a remote access controller, baseboard management controller, or chassis management controller that allows information technology (IT) administrators at a remote operations center 102 to deploy, update, monitor, and maintain IHSs 107*a-d* remotely. As a non-limiting example of a remote access controller, the integrated Dell Remote Access Controller (iDRAC) from Dell® is embedded within Dell PowerEdge™ servers and provides such remote functionality.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS 107*a-d* may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS 107*a-d* may include Random Access Memory (RAM), one or more processing resources such as a Central Processing Unit (CPU) or hardware or software control logic, Read-Only Memory (ROM), and/or other types of nonvolatile memory. Additional components of an IHS 107*a-d* may include one or more disk drives, one or more network ports for communicating with external devices as well as various I/O devices, such as a keyboard, a mouse, touchscreen, and/or a video display. An IHS 107*a-d* may also include one or more buses operable to transmit communications between the various hardware components.

IHSs 107*a-d* may be used to support a variety of e-commerce, multimedia, business, and scientific computing applications. In some cases, these applications may be provided as services via a cloud implementation. IHSs 107*a-d* are typically configured with hardware and software that provide leading-edge computational capabilities. IHSs 107*a-d* may also support various numbers and types of storage devices. Accordingly, services provided using such computing capabilities are typically provided as high-availability systems that operate with minimum downtime. The warranties provided by vendors of IHSs 107*a-d* and the related hardware and software allow the data centers 101*a-d* to provide contracted Service Level Agreement (SLA) to customers. Upon failure of an IHS 107*a-d*, data centers 101*a-d* and operations center 102 typically relies on a vendor to provide warranty support in order to maintain contracted SLAs.

Existing warranty systems usually comprise a standard warranty for a particular device, such as an IHS, server, etc. That standard warranty comprises the typical service coverage that is offered to customers by a vendor, such as a manufacturer, seller, re-seller, or subcontracted service agent, upon purchase of the individual device, such as a typical server warranty. In some cases, the vendor may offer an extended warranty if that option is available. The vendor may support many types of warranties, which can make it difficult for a customer representative to select the correct warranty type applicable for the customer product. For a larger customer accounts, the vendor may allocate a dedicated Technical Account Manager (TAM), who can analyze the customer requirements and help the customers with required warranty types. Unfortunately, customers may experience extended system downtime or degraded functionality when a non-optimal warranty has been purchased for the device. There are multiple reasons that contribute to the selection of a non-optimal warranty, such as limited understanding of cost or available warranty offerings, or changes in device usage or intent after purchase.

Warranties typically have common features, such as warranty type that identifies the covered component types (e.g., software or hardware), a warranty replacement SLA that identifies the level of services expected by the customer from the vendor (e.g., next business day (NBD), second business day (SBD), four hours (4H), eight hours (8H), mission critical (MC), etc.), and a support type that identifies the types of support provided (e.g., engineer/technician level one, two, or three (L1, L1+L2, L1+L2+L3), Post Support, etc.) or other support based on standard naming conventions. The warranty will also identify a warranty start date and a warranty end date. The warranty SLA can have a significant impact on the customer's operations. For example, a server with an SBD warranty may experience downtime up to two days, which could have been reduced to four hours if a 4H response warranty was in place.

In the illustrated embodiment of FIG. 1, data centers 101*a-d* are located in different cities 103-106, and each city 103-106 has different levels of service available. Another city 108 may provide vendor warranty support but has no data center associated with operations center 102. Service centers 109 and 110, respectively, are available in cities 103 and 104. Accordingly, if on-site technical support is needed, then data centers 107*a, b* would have the necessary support type available locally. On the other hand, data centers 107*c,d* would have to rely on support from service centers 109-111 in another city. Service centers 109-110 may also be staffed so that various combinations of support levels (e.g., L1, L1+L2, L1+L2+L3) may be available at different service centers. Similarly, warehouses 112, 113, respectively, are available in cities 103 and 105. Accordingly, if replacement parts are needed, then data centers 107*a,c* would more likely have the required parts available locally. On the other hand, data centers 107*b,d* would have to rely on parts shipped from warehouses 112-114 in another city. Cities 103-106 may be ranked as Tier 1, Tier 2, etc. based upon the availability of service centers and warehouses. The operations center 102, or a system management console 102*a* may be in contact with a vendor warranty system 115 either directly or through a public network 116, such as the Internet. Vendor warranty system 115 may track warranty terms and coverage for deployed IHSs 107*a-d*. For example, vendor warranty system 115 may comprise a customer support database 117. Customer support database 117 may store warranty information, such as terms and conditions, SLA, and other details for customer warranties. Vendor warranty system 115 may further comprise a deep learning neural network (DLNN) 118 that identifies devices within data centers 101*a-d* and manages warranties for those devices.

There can be gaps in warranty offers. For example, while some of warranty offers may have three warranty types (e.g., L1, L1+L2, L1+L2+L3), in other warranties only L1 or L1+L2 might be offered. Moreover, in some cases a warranty offers coverage for products such as system management software; however, other warranty offers may not provide such coverage. At times, there may be high volume of requests for support or part replacement that is not usually covered by warranty offers. If the volume of such requests increases, then the vendor may need to offer warranties with appropriate coverage, which would increase warranty revenue and increase customer confidence.

Certain scenarios can create negative customer experiences if the wrong warranty is in place. For example, a server's performance may be degraded for an extended time due to redundant part failures, such as failure of one drive in a Redundant Array of Independent Disks (RAID) virtual disk. A server may experience extended downtime due to the time required to replace a failed critical part, such as a CPU, memory, backplane, or system board failure. A servers may have to function with an extended risk due to redundant part failures, such as a power supply unit (PSU) or fan failure. Customer awareness of warranty coverage may also cause customer dissatisfaction. For example, if a customer is not aware that a certain failure is within warranty support, then the customer will never report the issue and may instead request part replacement, which may result in unnecessary downtime and cost that could have been avoided.

Figure 2:
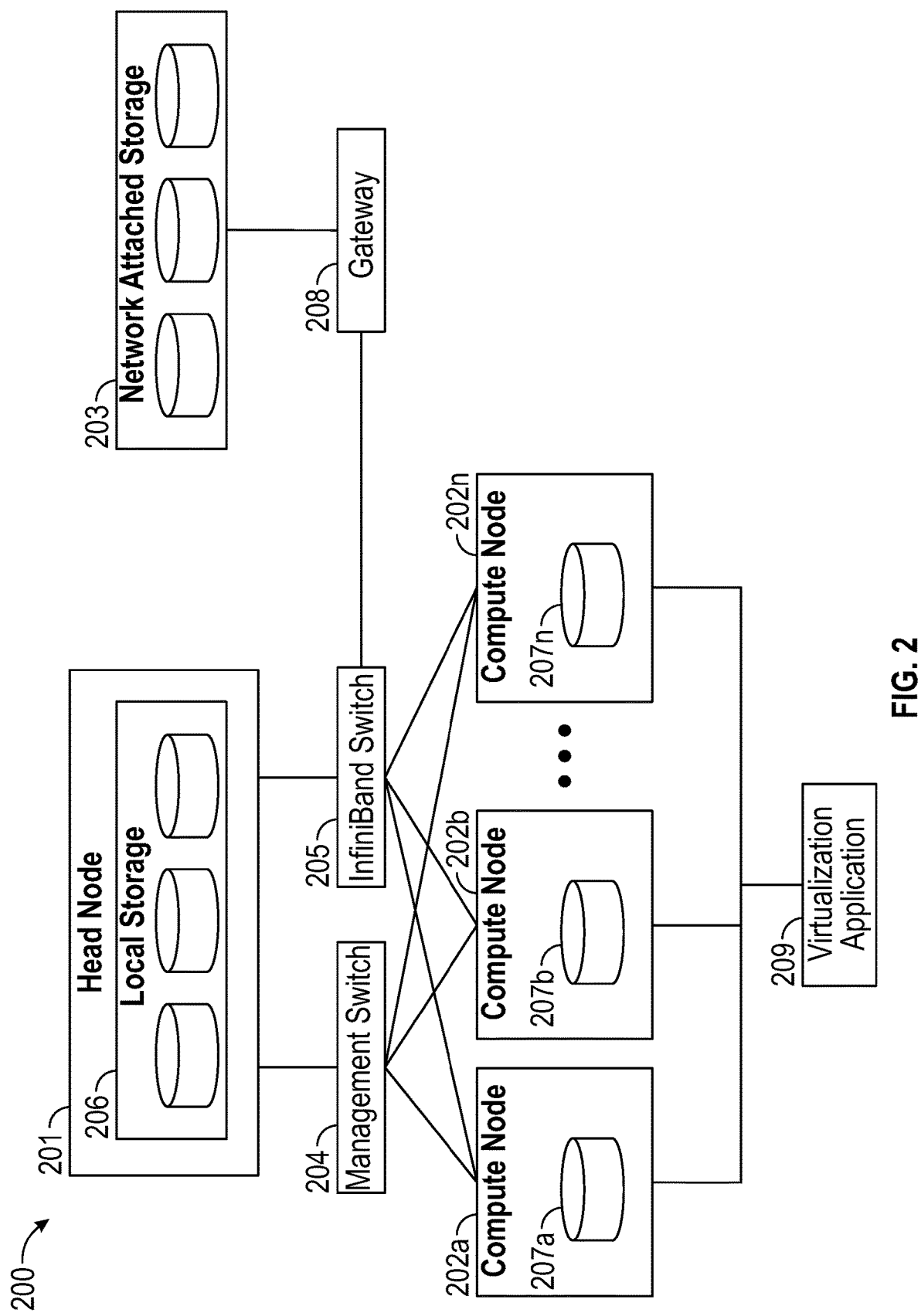
FIG. 2 illustrates the architecture for a logical group or cluster of IHSs or other nodes.

The devices in each data center 101a-d, such as IHSs 107a-d, may be organized into logical groups or clusters. FIG. 2 illustrates the architecture for a logical group or cluster 200 of IHSs or other devices. Cluster 200 comprises a head node 201, child compute nodes 202a-n, shared storage 203, and networks 204, 205. The head node 201, or master node, is used to deploy the cluster of compute nodes 202a-n, manage the compute node images, and provide tools to support job submission to compute nodes 202a-n. The compute nodes 202a-n execute assigned workloads and execute jobs submitted by users. As used herein, the terms server, node, and host are interchangeable and refer to an IHS device.

Head node 201 may have local storage 206, and compute notes 202a-n may have their own local storage 207a-n. The local disks 206 on cluster head node 201 and network attached storage 203 may be accessed by computer nodes 206a-n via a network file system (NFS). Head node 201 and compute nodes 202a-n are interconnected through InfiniBand switch 205, which provides network communications with a very high throughput and very low latency. Network attached storage 203 is also connected to InfiniBand switch 205 thorough a gateway 208 that allows for high-speed application performance while simultaneously consolidating network and I/O infrastructure. All compute nodes 202a-n and head node 201 are also connected to management switch 204 that supports in-band and out-of-band management via a remote access controller as well as cluster provisioning and deployment.

Nodes 202a-n in cluster 200 may host a number of virtual machines (VM) that are managed by a virtualization application 209, such as vSphere® from VMware. Virtualization application 209 may provide high availability (HA) for the VMs by pooling the VMs and the nodes 202a-n that they reside on into cluster 200. Nodes 202a-n in cluster 200 are monitored and, in the event of a failure, the VMs on a failed node are restarted on alternate nodes. A single node 202a-n in cluster 200 is elected as the primary host. The primary host monitors the state of all protected VMs and secondary hosts. The primary host detects and deals with node failure. The primary host uses network heartbeat signals to determine the type of node failure. Three types of host failure may be detected: failure (host stops functioning), isolation (host becomes network isolated), and partition (secondary host loses network connectivity with the primary host).

Degraded node hardware may run for minutes, hours, or days before eventually failing, which requires VM workloads to be HA restarted. In some configurations, proactive HA functionality detects hardware conditions of a host and, if a failure is anticipated or indicated, allows the user or virtualization application 209 to evacuate the VMs before a host can cause an outage. This allows the data center to keep the workloads from failing. Proactive HA may respond to different types of failure events, such as power supply, memory, fan, storage, and network. In a typical server failure, a node 202a-n suddenly fails, and HA restarts the VMs. However, proactive HA identifies certain node events that may lead to VM downtime and proactively evacuates VMs to a healthy node in the cluster.

There are two modes for a partially failed or failing node—quarantine mode and maintenance mode. In quarantine mode, no new VMs or workloads are added to the node and existing VMs are allowed to continue; however, the existing workloads will be slowly migrated if the workloads can be accommodated on other nodes in the cluster (i.e., if the performance of other VMs are not degraded and distributed resource scheduler (DRS) rules are not compromised by migration). In maintenance mode, all VMs on the host are migrated, and the node is places in maintenance mode.

As an example, if a node has two power supplies, standard HA would wait for both power supplies to fail, which would cause the node to fail, before restarting the workloads on another node. However, with proactive HA, when one power supply has failed, the node will continue operating using the redundant power supply. So, the workloads are still running on the node, but now there is a single point of failure, and the node is in a degraded state. When this occurs, proactive HA is triggered, and the node may be put in quarantine mode. Without waiting for the node to actually fail, the workloads may be proactively migrated to a healthy node in the cluster.

Cluster 200 is a combination of hardware and software. The hardware may comprise, for example, servers, chassis, switches, blades, prebuilt appliances (e.g., preconfigured virtual machines), and disk devices (e.g., Just a Bunch Of Disks (JBODs)). The software may comprise, for example, a virtual storage area network, virtual storage appliance, software-defined storage, server virtualization software, and hypervisor. Each of these individual hardware and software components may have an individual warranty attached. Typically, this individual warranty would be valid for some defined term, such as one, two, or three years, after the component was purchase or put in service. When these individual components are put together in a logical group, such as cluster 201, the warranty expiration dates are not necessarily the same. Instead, the warranty expiration dates usually depend on the purchase date of the individual components, even for identical components in the cluster. In existing data centers, this is likely to result in uneven warranty expiration across nodes, storage devices, and software for the same cluster, which creates unpredictable SLAs since the SLAs for components with expired warranties are no longer valid.

Any component's warranty expiration impacts the entire cluster's workload availability. Additionally, warranty expiration for a node can make it difficult to service software warranty issues since the issue must be reported on a device that still has an active software warranty. So, if the software failure occurs on hardware with an expired warranty, then that could complicate efforts to obtain support for the software. One option to address the problems created by uneven warranty expiration dates for the customer to sign up for an additional warranty period for older devices so that the warranty is good for the duration of the cluster deployment. However, this is unrealistic since purchase decisions are driven by budgetary considerations, and it is usually difficult (and not a typical procedure) for data center administrators to create clusters or logical groups using this kind of criteria.

Data centers typically have a very large number of servers. Each server can have different a warranty set each with a different expiration dates, including some warranties that have already expired. The risk of a server failure after warranty coverage has ended is significant. One issue related to a server failing without warranty coverage is that software support will not be available, which includes troubleshooting support, L1 support, and the ability to refers to other vendors for assistance. If the failure is a hardware-specific software issue, then, unless a root cause has been identified, there is a high risk that moving workloads to other servers may result in the issue being reproduced in those servers as well. Without sufficient warranty, the vendor would not be able to help the customer resolve the issue. Also, in the absence of a warranty, part availability and part replacement cannot be predicted. As a result, it may not be possible to estimate when a server will be operating again. Until the server is repaired, its assigned cluster will be working with low resources and, therefore, likely operating in a degraded state. Accordingly, failures in unprotected servers (i.e., a server with an expired warranty) have a substantial impact on the workloads assigned to the failed server.

In addition to servers that are out of warranty, the data center is likely to have some servers with warranties that are about to expire. In existing data centers, there is no mechanism to assign workloads based on warranty expiration. There are significant risks to allowing critical workloads to run on servers that have very low lifetime remaining on their warranty. In event of a failure of an unprotected server, that failure introduces an unpredictable delay for the workloads assigned to that server. One option would be to quarantine servers with a very low warranty time remaining; however, that would be a waste of any warranty time remaining. A better solution is to use short-term workloads on servers with expiring warranties. For example, a nonpersistent virtual desktop infrastructure (VDI) is a short-term workload and would suffer little impact if the host server failed. On the other hand, highly critical workloads, such as databases or application servers, should be posted to servers that have significant warranty time.

In one embodiment, systems and methods for assigning workloads in a data center handle expiring warranty servers by taking into account the criticality of the workloads, the warranty needs of the workloads, the warranty available time, and the lifetime of the workload in order to provide the most optimal solution to ensure the data center servers are used to best possible extent.

Figure 3:
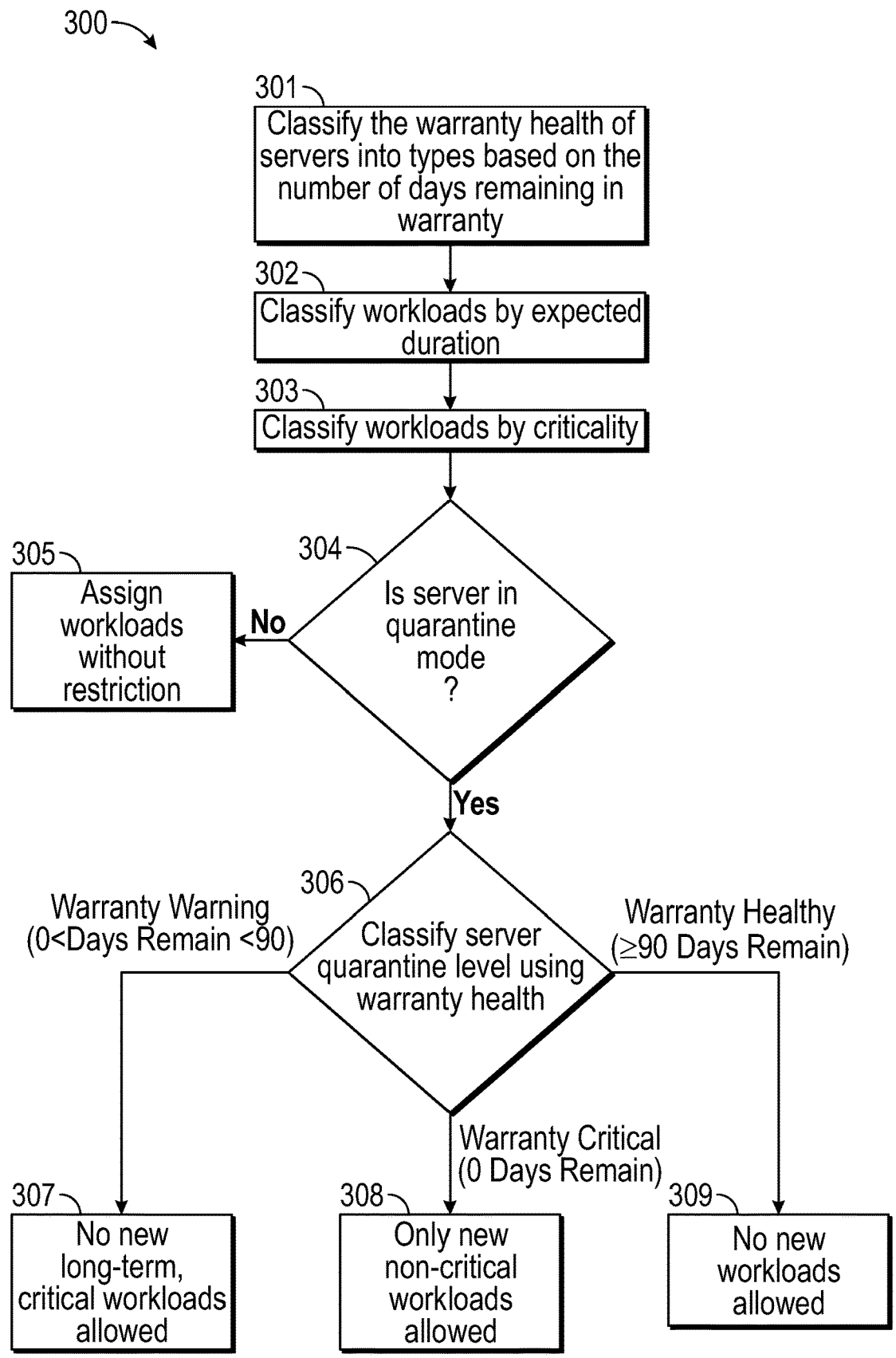
FIG. 3 is flowchart illustrating an example process 300 for data center workload management using server warranty information.
Figure 4:
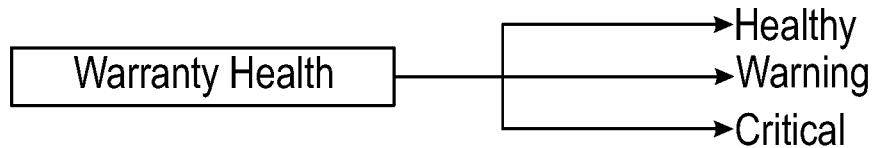
FIG. 4 illustrates a classification of warranty health types into healthy, warning, and critical categories.

FIG. 3 is flowchart illustrating an example process 300 for data center workload management using server warranty information. In step 301, the warranty health of servers is computed and categorized into types based on the number of days remaining in the warranty. In one embodiment, there are three warranty health types: healthy, warning, and critical as illustrated in FIG. 4. Healthy refers to servers with remaining warranty days of at least ninety days. Warning refers to servers with remaining warranty days of less than ninety days and at least one day. Critical refers to severs with an expired warranty period.

Figure 5:
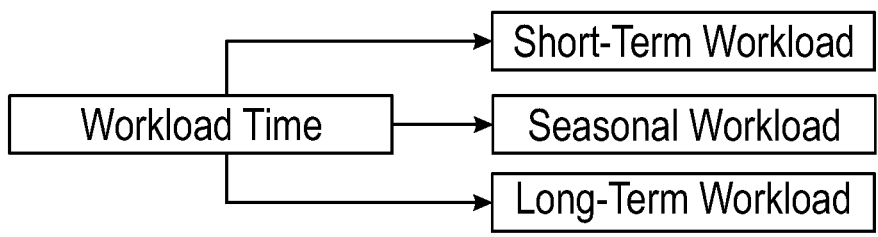
FIG. 5 illustrates a classification of workload durations short-term, seasonal, and long-term categories.

In step 302, new workloads are divided into different groups based upon the expected duration of the workload. In one embodiment, there are three workload durations: short-term workloads, seasonal workloads, and long-term workloads as illustrated in FIG. 5. Short-term workloads are alive only for a short duration, such as less than five days. For example, nonpersistent VDI solutions usually provide short-term workloads. Seasonal workloads are created for a medium duration, such as from five to ninety days. Long-term workloads are created for a longer or indefinite duration, such as longer than ninety days.

Figure 6:
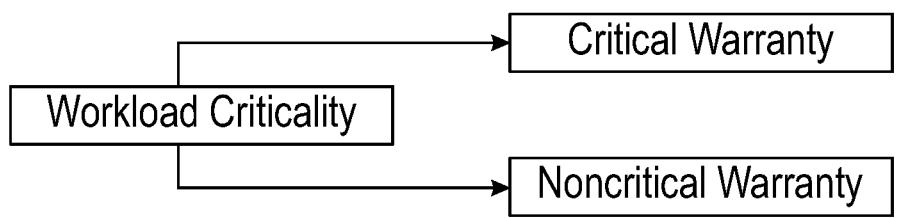
FIG. 6 illustrates a classification of workloads into critical and noncritical categories.

In step 303, a criticality for each workloads determined. In one embodiment, the workloads may be designated as critical or noncritical. The workload criticality may be classified based on tags assigned to a workload by a data center administrator, for example. Workloads that have a heavy dependency on infrastructure may be critical. For example, workloads that use pass-through access to hardware components or that leverage features from underlying infrastructure, such as virtual storage area networks or server virtualization, may be tagged as critical. The workload tag has two aspects: critical, which indicates a need to be hosted on a server with a warranty, and noncritical, which indicates that it can be hosted on a server with or without a warranty, as illustrated in FIG. 6.

In step 304, each server in a cluster is evaluated to determine whether it is in quarantine mode. If the server is not in quarantine mode, then in step 305 workloads are normally assigned to that server without restrictions or according to typical data center operations. However, if a server has been proactively placed in quarantine mode due to an impending failure, then in step 306 the server is further classified into a particular quarantine level. The quarantine mode three sublevels are: (1) standard quarantine mode, (2) critical-workload quarantine mode, and (3) long-time, critical-workload quarantine mode. The standard quarantine mode is the existing proactive HA quarantine mode.

In the critical-workload quarantine mode, new critical workloads are not allowed to be created on the server. Also, existing critical workloads will be evacuated to a healthy server in the cluster if the workloads can be accommodated (i.e., if the performance of other VMs are not degraded, and the DRS rules are not compromised). In critical-workload quarantine mode, both short-term and seasonal critical workloads are migrated to other servers.

In the long-time, critical-workload quarantine mode, new long-term critical workloads are not allowed on the failing server; however, both short-term and seasonal critical workloads are allowed. Noncritical workloads are also allowed. Existing long-term critical workloads will be evacuated to healthy servers if those workloads can be accommodated (i.e., if the performance of other VMs is not degraded, and the DRS rules are not compromised).

In steps 307-309, workloads are assigned to the server Based upon the quarantine mode sublevel identified in step 306. For servers with a warning-health warranty, new long-term critical workloads are not allowed in step 307, but other new workloads are allowed. For servers with a critical-health warranty, only new noncritical workloads are allowed in step 308. For servers with a healthy warranty, no new workloads are allowed in step 309, but existing workloads are allowed to continue.

Table 1 lists the workload types that are allowed for each quarantine mode.

TABLE 1

| | Quarantine Mode Categories | | |
|---|---|---|---|
| | Long-Time, Critical-Workload Quarantine Mode (Warranty Warning) (0 < days remain < 90) | Critical-Workload Quarantine Mode (Warranty Critical) (0 days remain) | Quarantine Mode (Warranty Healthy) (≥90 days remain) |
| Short-Term, Critical Workload | Allowed | Not Allowed | Not Allowed |
| Seasonal, Critical Workload | Allowed | Not Allowed | Not Allowed |
| Long-Term, Critical Workload | Not Allowed | Not Allowed | Not Allowed |
| Short-Term, Noncritical Workload | Allowed | Allowed | Not Allowed |
| Seasonal, Noncritical Workload | Allowed | Allowed | Not Allowed |
| Long-Term, Noncritical Workload | Allowed | Allowed | Not Allowed |

In the example embodiments, additional quarantine modes are disclosed for proactive HA and additional logic takes into account warranty aspects. A server will be moved to a short-term, critical quarantine mode if the warranty health is warning and will be moved to a noncritical quarantine mode if the warranty health is critical. Servers with a healthy warranty are treated as a standard quarantine mode wherein no new workloads are assigned. The introduction of new quarantine modes restrict workloads based on warranty information of server and the lifetime and criticality of the workload. The workloads are classified based on time, and that information is combined with proactive HA to schedule workloads on servers based on the remaining warranty time. The workloads are classified based on warranty needs (i.e., criticality) and then the workloads are tagged with the appropriate criticality.

In other embodiments, issues may arise due to different warranty coverage across nodes in a cluster. In this situation, the node warranties are not expiring or expired, but instead have different SLAs, for example. In a multi-cluster data center environment, it is possible to host workloads on different clusters and to move workloads across the clusters. Currently, data center environments distribute workloads based on resource needs and device update scenarios (e.g., cluster upgrades, OS upgrades, etc. may prompt a workload move). However, there may be situations wherein each of the nodes participating in a cluster may not have all of the relevant warranties for a particular workload.

Workloads and infrastructure nodes may require different levels of SLA in the event of failures. For example, a critical workload that is running on a virtual storage area network (vSAN) would require dedicated L1 support in case of vSAN failures. However, a compute-intensive workload need not be concerned with dedicated L1 support for vSAN failures. This requires that workloads be matched with the correct set of hardware having the required set of hardware and software warranties. On the other hand, it would be excessive to have a worst-case warranty for all nodes. Based on their expected needs, administrators can optimize the data center systems and purchase the appropriate hardware and software warranties. This ensures that the data center's budget is optimally used, and vendors also benefit from the best utilization of support resources they provide.

In one embodiment, a data center ensures that an optimal warranty is purchased for nodes, that nodes with related warranties are aggregated into clusters, and workloads are virtual storage area network relocated to clusters based on warranty needs. In this solution, workloads are distributed across multiple clusters. Both warranties, which ensure the required SLA to restore systems on failure, and workload resource utilization needs are considered to determine where to assign the workloads. Low utilization workloads are assigned to systems that have expired or soon to expire warranties. A cluster support score is computed based upon resource consumption and the warranties of individual nodes across multiple clusters. Low resource consumptions are allocated to nodes with expiring warranties. The workloads are classified based upon which node needs to be deployed on a suitable cluster. A workload SLA score is computed considering multiple parameters and properties as explained below. The workload SLA is matched with a cluster support score, and the workloads are distributed across multiple clusters so that the workload SLA is met across these clusters.

Figure 7:
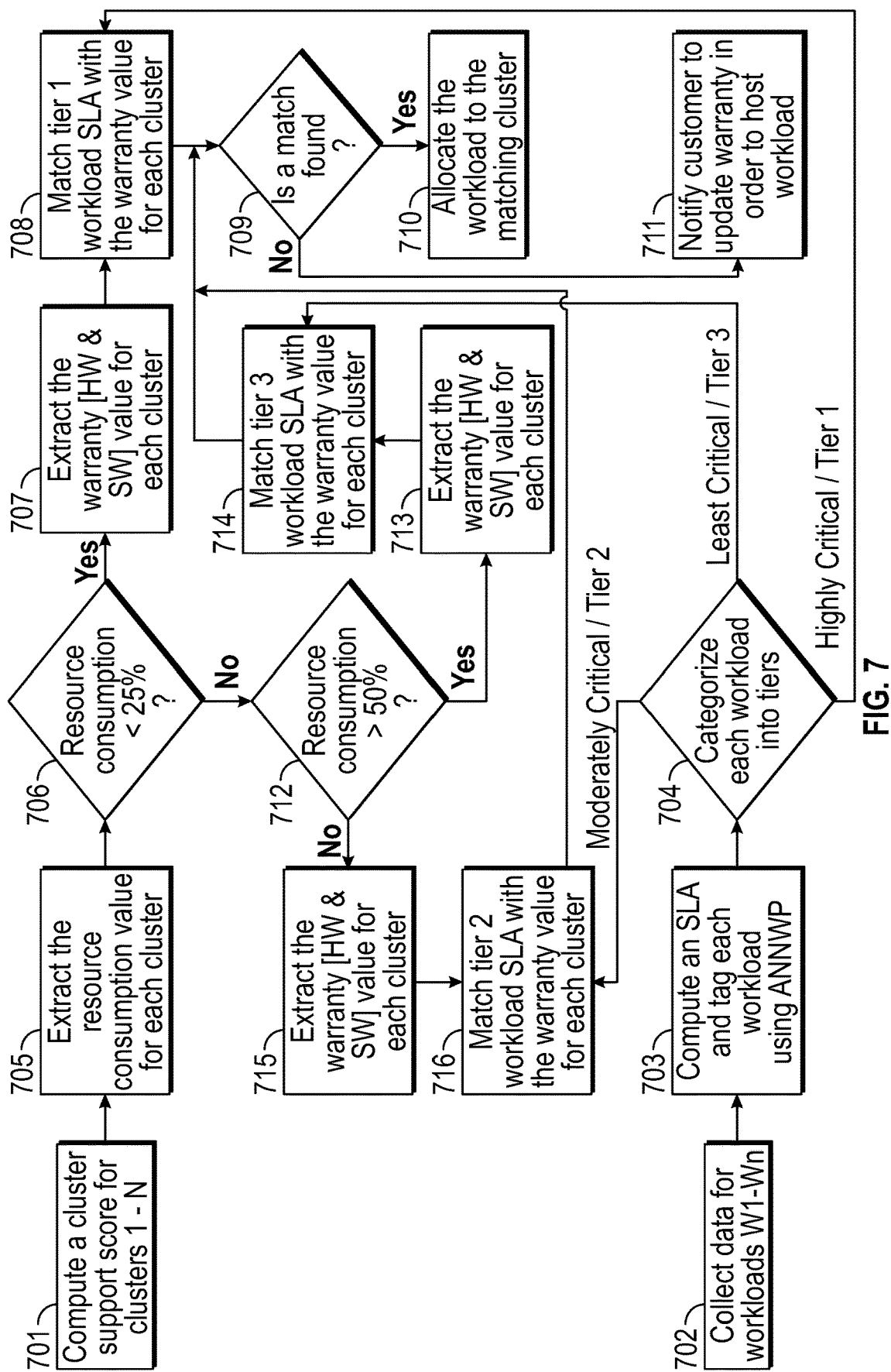
FIG. 7 is a flowchart illustrating a process for distributing workloads in a multi-cluster environment according to an example embodiment.

Referring to FIG. 1, IHSs 107a-n in any of data centers 101a-n may be organized into multiple clusters, such as cluster 200 in FIG. 2. Various IHSs 107a-n will typically have different warranty coverages and different warranty lifetimes remaining. In an example embodiment, there are a number of workloads W1-Wn that need to be distributed among the clusters. FIG. 7 is a flowchart illustrating a process 700 for distributing workloads in a multi-cluster environment according to an example embodiment. A cluster support score may be used to determine distribution of workloads across the data center based on cluster criticalities and SLAs. In step 701, a cluster support score is computed for multiple clusters, which are generally designated as clusters 1-N. The cluster support score is a map structure containing the following details at the data center level across multiple clusters:

(Resource consumption of the cluster, Value in %)
(Warranty [Hardware and Software], Value in years)

In step 702, information about each workload W1-Wn is collected. In step 703, an Artificial Neural Network for Workload Prediction (ANNWP) is used to compute an SLA and tag each workload W1-Wn. To compute SLA, the following properties and historical input data for various workloads are used as a training set for ANNWP: CPU usage, memory usage, hard disk space, and operating system (OS) data for the nodes where the workloads will be hosted. The ANNWP algorithm works as follows:

Training: Input data in the form of a workload vector is supplied to an input layer of ANNWP. The data is passed through layers of the network and is synthesized along with weights and biases at each layer. An output layer has a number of nodes equal to the number of target workloads. The ANNWP uses the softmax activation function to calculate probabilities at each node of the output layer. The output node having a maximum probability will be activated for that particular workload. The error, if any, is propagated to the previous layer, and the ANNWP would be retrained accordingly.

Tag workloads W1-Wn: The parameters or properties of the new workloads that need to be classified or tagged are supplied to the ANNWP. The algorithm generates a prediction for the workload, such as tagging the workload as a database workload, a VDI workload, etc.

The ANNWP may be an artificial intelligence (AI) or machine learning (ML) engine or processor that executes software instructions that operate to combine large amounts of data with fast, iterative processing and intelligent algorithms, which thereby allow the software to automatically learn from patterns and features in the data. The ANNWP may use machine learning, which automates analytical model building using methods from neural networks and statistics to find insights into data without explicitly programming regarding what to look for and what to conclude. A neural network is made up of interconnected units that processes information by responding to external inputs and relaying information between each unit. The process may require multiple iterations processing the data to find connections and derive meaning from unstructured data. The ANNWP may use advanced algorithms to analyze large amounts of data faster and at multiple levels. This allows intelligent processing for identifying and predicting rare events, understanding complex systems, and identifying unique scenarios. The ANNWP may use application programming interfaces (APIs) to add functionality to existing systems and software. The ANNWP can reason on input data and output an explanation of the data.

After successful tagging of workloads in step 703, the workloads are categorized into three tiers: tier 1, tier 2, and tier 3, in step 704. Tier 1 workloads have a high criticality and will be allocated to a cluster having low resource-utilization and a high warranty term remaining (e.g., four to five years). The workload SLA for Tier 1 is four to eight hours (e.g., 4H/8H). Tier 2 workloads have a moderate criticality and will be allocated to a cluster having moderate resource-utilization and a moderate warranty term remaining (e.g., three to four years). The workload SLA for Tier 2 is next or second business day (e.g., NBD/SBD). Tier 3 workloads are allocated to a cluster having a high resource-utilization and a low warranty term remaining (e.g., less than three years). The workload SLA for Tier 3 may be seven days. For example, a database workload would have a high criticality and, therefore, should be categorized into Tier 1, while a VDI workload would have a low criticality and, therefore, should be categorized into Tier 3.

Steps 701-704 may happen contemporaneously or sequentially. These steps may be running continuously to classify new workloads as they arrive and new clusters as they are created and to update existing clusters as warrant term elapses. Once the clusters are assigned a cluster support score and the workloads are tagged with an SLA, then the workloads may be distributed based on these parameters.

In step 705, the resource consumption value for the cluster is extracted from the cluster support score map structure for each of the clusters at the data center level. This provides the resource utilization for each of the clusters.

In step 706, the clusters are filtered to identify clusters having a resource utilization that is less than 25%. In one embodiment, clusters with this level of resource utilization are desirable for highly critical or Tier 1 workloads. In step 707, the Warranty [Hardware and Software] value is extracted from the cluster support score map structure for each of the clusters that meet the criteria in step 706. This value provides the SLA for the clusters. In step 708, the workload SLA for Tier 1 workloads from step 704 are matched with the support score of each of the clusters. In step 709, a determination is made whether a match was found. If match was found, then the workload is allocated the matching cluster in step 710. If match is not found, then in step 711 a notification is sent to the customer to update the warranty so that the cluster can host that workload.

Clusters that do not have a resource consumption less than 25% in step 706 are further filtered in step 712 to identify clusters having a resource utilization that is greater than 50%. In one embodiment, clusters with this level of resource utilization are desirable for least critical or Tier 3 workloads. In step 713, the Warranty [Hardware and Software] value is extracted from the cluster support score map structure for each of the clusters that meet the criteria in step 712. This value provides the SLA for those clusters. In step 714, the workload SLA for Tier 3 workloads from step 704 are matched with the support score of each of the clusters. In step 709, a determination is made whether a match was found. If match was found, then the workload is allocated the matching cluster in step 710. If match is not found, then in step 711 a notification is sent to the customer to update the warranty so that the cluster can host that workload.

If a cluster is not filtered out in step 712, then that clusters would have a resource utilization that is at least 25% but no more than 50%. In one embodiment, clusters with this level of resource utilization are desirable for moderately critical or Tier 2 workloads. In step 715, the Warranty [Hardware and Software] value is extracted from the cluster support score map structure for each of the clusters that do not meet the criteria in step 712. This value provides the SLA for those clusters. In step 716, the workload SLA for Tier 2 workloads from step 704 are matched with the support score of each of the clusters. In step 709, a determination is made whether a match was found. If match was found, then the workload is allocated the matching cluster in step 710. If match is not found, then in step 711 a notification is sent to the customer to update the warranty so that the cluster can host that workload.

Generally, process 700 provides a two-level screening for matching workloads to cluster. Initially, at a first level, clusters are identified for a particular resource consumption that derived from the cluster support score. This resource consumption is paired with a workload Tier. In the second level, after finding a suitable cluster for each Tier, the cluster's warranty is checked to determine the most suitable cluster for a particular workload. Accordingly, cluster support scores are used to distribute the workloads at the data center level. The computation of workload SLA leverages resource computation needs. The warranty needs of a workload are derived based on the resource computation and workload type. By matching the workload SLA and cluster support score, the process determines where a workload should be assigned, and workloads are distributed accordingly.

In an example embodiment, a method for managing workloads assigned to nodes in a data center comprises identifying nodes that are in a quarantine status; determining a remaining warranty time for the nodes in quarantine status; determining an expected duration for a workload; determining a criticality of the workload; and assigning the workload to a node based upon the remaining warranty time, the expected workload duration, and the workload criticality. The nodes may be placed in the quarantine status when a potential node failure is detected but the node is operating. The criticality of the workload may be determined based upon a criticality assigned by a user. The workload may be assigned to nonquarantined nodes without considering warranty restrictions. The workload may be assigned to a quarantined node.

The remaining warranty time may be classified into two or more categories based upon a length of time before a warranty ends. The categories may comprise healthy, warning, and critical categories, where each of the categories corresponds to a particular range of warranty days remaining. The workload may be blocked from quarantined nodes having a healthy warranty time remaining. The workload may be permitted to be assigned to quarantined nodes having an expired warranty if the workload criticality is noncritical. The workload may be permitted to be assigned to quarantined nodes having a warning warranty time remaining if the workload is not a long-term, critical workload.

The expected duration may be classified into two or more categories based upon a length of time typically required for a workload type. The categories may comprise short-term, seasonal, and long-term categories, where each of the categories corresponds to a particular range of days that the workload is typically executed.

The nodes may be arranged in a cluster, where the nodes are one or more of an IHS, a server, a blade server, a rack server, and a host device.

In another example embodiment, a method for distributing a plurality of workloads across a plurality of clusters in a data center comprises computing a cluster support score for each of the clusters, the cluster support score comprising a resource consumption of the cluster and a warranty value for the cluster; computing a workload SLA for each of the workloads using an ANNWP; and distributing each of the workloads to one of the clusters based on the cluster support scores and the workload SLAs.

The method may further comprise extracting a resource consumption value from each cluster support score; and classifying each cluster into a workload tier based upon the resource consumption value.

The method may further comprise classifying each workload into a workload tier based upon the SLA computed for each workloads using the ANNWP.

The method may further comprise classifying each cluster into a workload tier based upon the resource consumption value; classifying each workload into a workload tier based upon the SLA computed for each workloads using the ANNWP; and matching workloads and clusters in a same tier based upon the warranty value for each cluster in the tier.

The method may further comprise notifying a customer of a need to update a warranty if a workload does not match a cluster in the same tier.

The method may further comprise training the ANNWP using data from historical workloads, wherein the data is selected from one or more of a CPU usage, a memory usage, a hard disk space, and operating system data.

The method may further comprise tagging each workload with the SLA computed for the workload by the ANNWP.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A method for managing workloads assigned to nodes in a data center, comprising:
   assigning a primary node among a cluster of nodes, wherein each of the nodes are Information Handling Systems (IHS) hosting a plurality of virtual machines (VM), and wherein each workload is assigned to run on a selected VM in the cluster, the primary node monitoring a status of the nodes in the cluster;
   identifying, by the primary node, nodes within the cluster that are in a quarantine mode, wherein a node is placed in quarantine mode when a potential node failure is detected but the node is still operating;
   determining a remaining warranty time for the nodes in quarantine status by retrieving warranty information for each component in the node from a database within a vendor warranty system;
   determining an expected duration for a selected workload;
   determining a criticality of the selected workload by retrieving a workload tag assigned to the workload by a user of the cluster;

assigning, by the primary node, the selected workload to a node in the cluster based upon the remaining warranty time, the expected workload duration, and the workload criticality to ensure that the selected workload is completed within an assigned node's expected lifetime; and executing the selected workload on the assigned node in the cluster.

2. The method of claim 1, wherein the remaining warranty time is classified into two or more categories based upon a length of time before a warranty ends.

3. The method of claim 2, wherein the categories comprise of at least one of: healthy, warning, and critical categories, and wherein each of the categories corresponds to a particular range of warranty days remaining.

4. The method of claim 3, wherein the selected workload is blocked from quarantined nodes having a healthy warranty time remaining.

5. The method of claim 3, wherein the selected workload is permitted to be assigned to quarantined nodes having an expired warranty if the workload criticality is noncritical.

6. The method of claim 3, wherein the selected workload is permitted to be assigned to quarantined nodes having a warning warranty time remaining if the workload criticality is not critical.

7. The method of claim 1, wherein the expected duration is classified into two or more categories.

8. The method of claim 7, wherein the categories comprise of at least one of: short-term, seasonal, and long-term categories, and wherein each of the categories corresponds to a particular range of days associated with that the expected workload duration.

9. The method of claim 1, wherein the criticality of the selected workload is determined based upon a criticality assigned by a user.

10. The method of claim 1, wherein the selected workload is assigned to nonquarantined nodes without considering warranty restrictions.

11. The method of claim 1, wherein the selected workload is assigned to a quarantined node.

* * * * *